Nov. 17, 1959  J. A. DEL FRANCIA  2,912,975
DEEP FAT FRYER

Filed Dec. 10, 1956  2 Sheets-Sheet 1

Fig. 1.

JOEL A. DEL FRANCIA
INVENTOR.

BY *[signature]*

ATTORNEY

Nov. 17, 1959   J. A. DEL FRANCIA   2,912,975
DEEP FAT FRYER
Filed Dec. 10, 1956   2 Sheets-Sheet 2
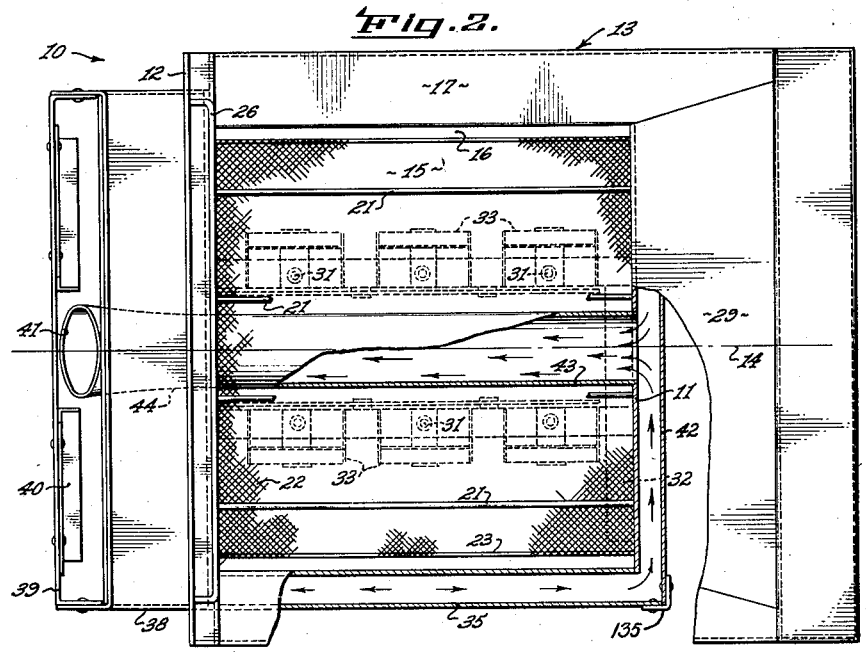
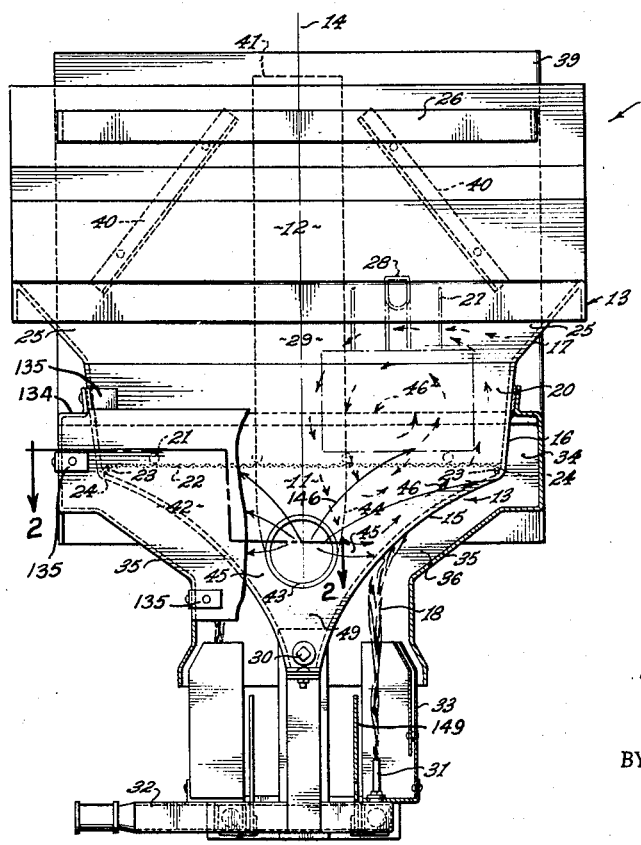
JOEL A. DEL FRANCIA
INVENTOR.
BY
ATTORNEY United States Patent Office 2,912,975
Patented Nov. 17, 1959

2,912,975

DEEP FAT FRYER

Joel A. Del Francia, Alhambra, Calif.

Application December 10, 1956, Serial No. 627,187

3 Claims. (Cl. 126—391)

This invention relates generally to what is commonly known as deep fat type frying equipment and more particularly has to do with improvements in such fryers directed primarily to substantially increasing their fat heating efficiencies thereby reducing the required edible cooking times and at the same time achieving savings in heat input to fryers. Moreover, the present invention permits recovery of otherwise wasted heat energy, and in general improves the overall performance and operation of deep fat frying equipment.

In the past it has been customary to heat the fat in fryers to a high temperature by directing impingement of gas flames directly against the outer sides of fat receptacles and thereafter conducting the hot exhaust gases to a suitable venting stack. If it was found that the fat did not heat sufficiently rapidly, the practice was to increase the flow of gas to the burners or to add additional burners where space was available. These procedures were wasteful not only of gas itself but also resulted in loss of the heat content of the discharged exhaust gases, and the liimted space requirements of commercial type fat fryers resulted in the establishment of undesirably limited heat transfer rates to the fat, which correspondingly prevented reducing the edible cooking times.

The present invention contemplates the provision of novel frying equipment by which all or most of the above difficulties are overcome by improving the fat heating and edible cooking efficiencies of fryers. Accordingly, heat is caused to be transferred to fat flowing within a receptacle space between an externally heated portion of the receptacle and internally heated heat transfer means in the receptacle itself, the latter being so located as to give an effective final heat "boost" to the circulating fat impinging thereon causing it to surge upwardly toward the edibles to be cooked. At the same time, the receptacle is shaped so that the externally heated portion thereof heats and directs the cooler stream of circulating fat downwardly and laterally toward the "booster" heat transfer means, which is preferably tubular in shape for maximum heat transference and for directing the fat flow upwardly, while permitting easy cleaning of the receptacle interior around the tube.

These and other features and objects of the invention, as well as the details of an illustrative embodiment, will be more fully understood from the following detailed descripton of the drawings, in which:

Fig. 1 is a perspective view of the complete fryer;

Fig. 2 is a plan view of the fryer broken away in part to show its interior construction;

Fig. 3 is a front elevation of the fryer broken away to show its interior construction.

Referring generally to Figs. 1 through 3, the illustrated fryer is in the form of a receptacle 10 having interconnected front, back and opposite side plates 11, 12 and 13 respectively. The opposite side plates are symmetrical with respect to a central vertical plane 14 through the fryer, and include integral lower, mid and upper portions 15, 16 and 17 respectively. The lower side plate portions 15 are generally in V-shape and are smoothly curved inwardly so as to provide greater inner surface area for contact with fat in the receptacle and greater outer surface area for contact by flames indicated at 18, resulting in improved heat transfer to the fat. The side plate mid portions 16 have a small amount of side draft or taper so as to permit free reception of wire baskets 19 in the cooking zone 20 formed between these mid portions. When in the cooking zone, the basket wire supports 21 seats on a horizontal screen 22 extending across the receptacle interior and supported by means of integral wires 23 resting on shoulders 24 formed at the junction between side plate portions 15 and 16. As a result, the edibles in the baskets remain out of proximity to the hot receptacle side plates so as to prevent burning thereof.

The upper portions 17 of the receptacle side plates flare upwardly and outwardly away from the central plane 14 so as to define a fat surge zone 25 extending above the levels of the baskets in the cooking zone, it being a function of the fryer to heat the hydrogenated fat to a high enough temperature, i.e. around 350° F., and at the same time so confine the fat, that it circulates within the receptacle and in so doing surges upwardly through the baskets and into the surge zone 25 so as to continuously supply heat to the edibles in the baskets.

Receptacle back plate 12 extends between the two side plates and upwardly for a considerable distance therebetween, and an offset portion of the back plate mounts an elevated horizontal bar 26 over which basket wire hooks 27 are adapted to hang for supporting the baskets 19 out of the fat, for draining the edibles. When the baskets are seated on the horizontal screen 22 in the receptacle, the basket handles 28 extend over a forward portion of the surge zone formed by the front plate overhang 29. A drain plug 30 threaded into an opening in the lowermost portion of the forward plate 11 may be removed whenever it is desired to drain the contents of the receptacle.

Two sets of three gas burners 31 are mounted below the arcuate lower portions of the side plates in such position that flames 18 from the burners will rise to contact the side plates as described above. The burners are supplied with gas by a common line 32, and each of the burners is individually shrouded at 33 so as to confine the flames to impinge against the receptacle side plates.

At the levels of the lower portions 15 of the receptacle side plates, the burner flames are confined to flow upwardly into the manifolds 34 by side baffles 35 spaced from the receptacle side plates and joined to the mid portions 16 thereof above the manifolds 34 formed by these baffles. Thus, the baffles confine the burner flames in the heating zones 36 between the baffles and the receptacle side plates for optimum heat transfer to fat flowing in the receptacle. The top closure for manifold 34 is shown at 134.

Rear baffling 38 extending to the rear of the receptacle connects with the side baffles 35 at opposite sides thereof for receiving some of the exhaust gases from the manifolds 34, and are drawn from the rear baffling into a rectangular shaped stack 39 by a convection. Elongated sheet metal members 40 in the stack 39 are angled upwardly and inwardly toward a smaller central stack 41 located within the rectangular stack 39 for directing the gas flow in the latter stack toward the central stack increasing the gas velocity and thereby inducing more rapid gas flow from the central stack as will be described.

Extending across and spaced from the receptacle spaced plate 11 is a front baffle 42 joined to the two side baffles 35 by clips 135 for conducting hot exhaust gas from the manifolds 34 toward a central tube 43 shown in the drawings as shown by arrows 146. Baffles 35 and 42 together comprise a shell having an air inlet below the manifolds or heating zone, for receiving upward flow of air to mix with combustible gas jetted from the burners 31. The tube extends horizontally within the receptacle between the two side plate portions 15 and opens through the front plate 11 so that hot exhaust gases may flow into and through the tube in heat transferring relation therewith. A suitable L pipe 44 receives gases from the tube 43 and discharges into the central stack 41 so that the gases are drawn upwardly through and discharged from the stack. While not all of the gases pass through the tube 43, sufficient of them do that a substantial recovery of the heat content of the gases is realized through transfer of this heat through the tube 43 and then to the fat circulating in the receptacle.

The tube may be made of the same metal as the receptacle itself and is sufficiently large as indicated in Fig. 3 to facilitate heat transfer to the fat in the receptacle. Thus, the tube bore is larger than the space 45 between the tube and receptacle side plate portions 15 in which circulating fat flows as indicated by the arrows 46. The fat circulates in two loops formed on opposite sides of the central plane 14 generally as indicated in Fig. 3 with the fat heated by the side walls 15 flowing upwardly thereabove, then laterally through the cooking zone 20 toward plane 14 for heating the edibles, then downwardly toward tube 43 to be pre-heated thereby, and finally flowing laterally toward the side walls 15. In addition, the tube serves generally to separate the hotter fat circulating in the upper portion of the receptacle from cooler fat in the lower zone 49 beneath the tube, the temperature difference being roughly around 70° F. Baffle 149 prevents flame 18 from heating lower zone 49.

As a result of providing the rather large heat boost tube in the receptacle itself, the cooking time of potatoes is typically reduced approximately 20%, and at the same time the amount of fat in the fryer is decreased from about 30 pounds when no tube is used to around 23 pounds with the tube. At the same time, temperature measurements show that the stack temperatures of the gases are reduced from around 1000° F. when no tube is utilized to about 650° F. when the tube is provided, all of the above figures indicating the substantial heat recovery realized and the improved operation and performance of the fryer. Another important benefit results from the fact that the receptacle remains easy to clean since only one rather large tube is centrally located in the fryer in spaced relation to its walls.

I claim:

1. An improved fryer, comprising a fat receptacle opening upwardly for receiving an edible container placed in the upper interior of the receptacle in contact with hot fat circulating therein, said receptacle having upwardly diverging side walls and upwardly extending front and rear end walls, a stack at the rear of the receptacle, a circular cross section afterburner tube extending longitudinally in the lower interior of the receptacle in spaced relation to said diverging side walls, said tube having gas entrance and discharge openings communicating respectively through said front end wall and through said rear end wall with said stack, gas burners spaced directly beneath the longitudinal extents of said receptacle side walls for jetting hot gases directly against the major extents of the side wall undersides, and a shell having front and side panels respectively spaced outwardly from said receptacle front and side walls to form therewith an enclosed heating zone extending above the level of said burners and adjacent the lower exterior of said receptacle for confining hot gases to travel forwardly adjacent said side walls and then across and adjacent the entire transverse extent of said front wall into and through said tube to flow ultimately into said stack, said shell front panel having transverse horizontal extent greater than that of said receptacle front wall whereby said gases are brought into direct and intimate heat transfer contact with the receptacle side and front walls and with the interior extent of said tube and the gas temperature is substantially lowered as a result of rapid and extensive heat transfer to fat in the receptacle, said shell having a downwardly opening inlet below the level of said heating zone for receiving upward flow of air to mix with combustible burner gas flowing upwardly through said shell inlet, said shell inlet extending in direct under communicating relation with the space between the receptacle forward wall and the shell front panel so that air drawn upwardly through said inlet and directly into said tube is adapted to effect complete combustion of burner gases flowing therein.

2. The invention as defined in claim 1 in which the tube diameter is greater than the spacing between the tube and each of said receptacle side walls.

3. The invention as defined in claim 2 in which said receptacle side walls extend substantially in V-shape so that heated fat is adapted to circulate upwardly above said walls and downwardly toward said tube, each of said side walls being inwardly convex toward said tube.

References Cited in the file of this patent

UNITED STATES PATENTS

| | | |
|---|---|---|
| 137,140 | Lewis | Mar. 25, 1873 |
| 1,264,740 | Young | Apr. 30, 1918 |
| 2,433,134 | Long | Dec. 23, 1947 |
| 2,452,472 | Keating | Oct. 26, 1948 |
| 2,678,039 | Keating | May 11, 1954 |